(12) United States Patent
Sprachmann et al.

(10) Patent No.: US 10,232,307 B2
(45) Date of Patent: Mar. 19, 2019

(54) PROCESS FOR CAPTURING CO2 FROM A GAS STREAM

(71) Applicant: SHELL OIL COMPANY, Houston, TX (US)

(72) Inventors: Gerald Sprachmann, Amsterdam (NL); Gerardus Antonius Franciscus Van Mossel, Amsterdam (NL); Hendrik Dathe, Amsterdam (NL); Tobias Proell, Vienna (AT); Gerhard Schoeny, Vienna (AT)

(73) Assignee: SHELL OIL COMPANY, Houston, TX (US)

( * ) Notice: Subject to any disclaimer, the term of this patent is extended or adjusted under 35 U.S.C. 154(b) by 114 days.

(21) Appl. No.: 15/525,136

(22) PCT Filed: Nov. 3, 2015

(86) PCT No.: PCT/EP2015/075511
§ 371 (c)(1),
(2) Date: May 8, 2017

(87) PCT Pub. No.: WO2016/074980
PCT Pub. Date: May 19, 2016

(65) Prior Publication Data
US 2018/0272266 A1    Sep. 27, 2018

(30) Foreign Application Priority Data

Nov. 10, 2014  (EP) ..................................... 14192575

(51) Int. Cl.
*B01D 53/08* (2006.01)
*B01D 53/62* (2006.01)
(Continued)

(52) U.S. Cl.
CPC .............. *B01D 53/12* (2013.01); *B01J 20/22* (2013.01); *B01J 20/28004* (2013.01);
(Continued)

(58) Field of Classification Search
CPC ........ B01D 53/06; B01D 53/08; B01D 53/12; B01D 2253/202; B01D 2257/504;
(Continued)

(56) References Cited

U.S. PATENT DOCUMENTS 2,545,067 A * 3/1951 Berg ...................... B01D 53/08
                                                          95/112
2,793,713 A * 5/1957 Fritz ......................... C07C 7/12
                                                          208/149

(Continued)

FOREIGN PATENT DOCUMENTS

EP   2463013 A1   6/2012
GB    761305 A   11/1956

OTHER PUBLICATIONS

International Search Report and Written Opinion received for PCT Patent Application No. PCT/EP2015/075511, dated Jan. 22, 2016, 11 pages.

(Continued)

*Primary Examiner* — Frank M Lawrence, Jr.

(57) ABSTRACT

The present invention relates to a process for capturing carbon dioxide from a gas stream. The gas stream is contacted with solid adsorbent particles in an adsorption zone. The adsorption zone has at least two beds of fluidized solid adsorbent particles, and the solid adsorbent particles are flowing downwards from bed to bed. The solid adsorbent particles comprise 15 to 75 weight % of organic amine compounds. The gas stream entering the adsorption zone has a dew point which is at least 5° C. below the forward flow temperature of the coolest cooling medium in the adsorption (Continued)

zone. Carbon dioxide enriched solid adsorbent particles are heated, and then regenerated. The desorption zone has at least two beds of fluidized solid adsorbent particles, and the stripping gas is steam. The regenerated particles are cooled and recycled to the adsorption zone.

15 Claims, 3 Drawing Sheets

(51) Int. Cl.
  *B01D 53/12* (2006.01)
  *B01J 20/28* (2006.01)
  *B01J 20/34* (2006.01)
  *B01J 20/22* (2006.01)

(52) U.S. Cl.
  CPC ... *B01J 20/28011* (2013.01); *B01J 20/28061* (2013.01); *B01J 20/28064* (2013.01); *B01J 20/28073* (2013.01); *B01J 20/28076* (2013.01); *B01J 20/3425* (2013.01); *B01J 20/3466* (2013.01); *B01J 20/3483* (2013.01); *B01D 2253/202* (2013.01); *B01D 2257/504* (2013.01); *B01D 2259/402* (2013.01); *B01D 2259/40086* (2013.01); *B01D 2259/40096* (2013.01); *B01D 2259/65* (2013.01)

(58) Field of Classification Search
  CPC ........... B01D 2259/40086; B01D 2259/40096; B01D 2259/402; B01D 2259/65; B01J 20/22; B01J 20/28004; B01J 20/28011; B01J 20/28061; B01J 20/28064; B01J 20/28073; B01J 20/28076; B01J 20/3425; B01J 20/3466; B01J 20/3483
  USPC ....... 95/107–112, 139; 96/123, 150
  See application file for complete search history.

(56) References Cited

U.S. PATENT DOCUMENTS

| | | | | |
|---|---|---|---|---|
| 2,992,895 | A | * | 7/1961 | Feustel ................. B01D 53/08 423/239.1 |
| 4,511,375 | A | | 4/1985 | Bevier |
| 5,496,395 | A | * | 3/1996 | Yamazaki ............. B01D 53/12 55/356 |
| 5,676,738 | A | * | 10/1997 | Cioffi .................... B01D 53/08 95/109 |
| 6,547,854 | B1 | | 4/2003 | Gray et al. |
| 6,908,497 | B1 | | 6/2005 | Sirwardane |
| 2011/0005395 | A1 | | 1/2011 | Vimalchand et al. |
| 2013/0291721 | A1 | | 11/2013 | Silverman et al. |
| 2014/0251136 | A1 | * | 9/2014 | Park ...................... B01D 53/62 95/108 |

OTHER PUBLICATIONS

Sayari et al., "Flue gas treatment via COadsorption", Chemical Engineering Journal, Elsevier Sequoia, Lausanne, CH, vol. 171, No. 3, Feb. 5, 2011, pp. 760-774, XP028098345.

* cited by examiner

PROCESS FOR CAPTURING CO2 FROM A GAS STREAM

PRIORITY CLAIM

The present application is the National Stage (§ 371) of International Application No: PCT/EP2015/075511, filed Nov. 3, 2015, which claims priority from European Patent Application No. 14192575.0, filed Nov. 10, 2014 incorporated herein by reference.

FIELD OF THE INVENTION

The present invention relates to a process for capturing carbon dioxide from a gas stream. The present invention especially relates to a process for capturing CO2 from a highly diluted CO2 gas stream such as flue gas.

BACKGROUND OF THE INVENTION

During the last decades there has been a substantial global increase in the amount of carbon dioxide emission to the atmosphere. Emissions of carbon dioxide into the atmosphere are thought to be harmful due to its "greenhouse gas" property, contributing to global warming. Following the Kyoto agreement, carbon dioxide emission has to be reduced in order to prevent or counteract unwanted changes in climate. Large anthropogenic sources of carbon dioxide emission are processes that combust fossil fuels, for example coal, natural gas or petroleum products, for electricity generation, transportation and heating purposes, and for production of steel and cement. These processes result in the production of gases comprising carbon dioxide. Thus, removal of at least a part of the carbon dioxide prior to emission of these gases into the atmosphere is desirable.

Processes for removal of carbon dioxide from gases are known in the art. Many processes are based on liquid absorption processes, with varying compositions of the absorption liquids. A drawback of these processes is the high energy consumption in the stripper unit to recover the absorbent, leading to a lower overall energy output.

Other processes make use of solid adsorbents.

The effect of moisture on the $CO_2$ uptake of several adsorbents is discussed in "Flue gas treatment via $CO_2$ absorption", A. Sayari et al., Chem. Eng. J. 171 (2011) 760-774, for systems for which studies in the literature were available. Sayari indicates that moisture adversely affects $CO_2$ uptake in zeolites and activated carbon, and that moisture adversely affects the stability and $CO_2$ uptake of metal organic frameworks (MOFs) and zeolite-like MOFs (ZMOFs). Covalent organic frameworks (COFs) do not have hydrophilic adsorption sites, but showed a low $CO_2$ uptake. Sayari further reports that moisture enhanced the $CO_2$ capacity of polyethylene-imine (PEI) impregnated MCM-41 silica. Mono-ethanolamine improved the moisture tolerance of 13X zeolite. Sayari indicates that PEI impregnated silicon dioxide (CARiACT) and PEI impregnated MPPA (Diaion) showed enhanced adsorption capacity due to moisture.

EP-A-2463013 describes a process for removing carbon dioxide from a gas stream in an energy-efficient and relatively simple manner by contacting the gas stream with a regenerable solid adsorbent in a circulating fluidized bed system with two reactors, each having a single stage fluidized bed. The disadvantage of this process is that high $CO_2$ capture efficiencies (percentage of $CO_2$ removed from the gas) require high solid recirculation rates and/or high flows of stripping gas into the regenerator and thus high amounts of regeneration energy.

There is a need for a more efficient process for the removal of carbon dioxide from gases using solid adsorbents.

SUMMARY OF THE INVENTION

It has now been found that carbon dioxide can effectively be removed from a gas stream in a very energy-efficient and relatively simple manner when a gas stream is contacted with a regenerable solid adsorbent in a counter current multistage fluidized bed system.

Accordingly, the present invention relates to a process for capturing carbon dioxide from a gas stream, the process comprising the steps of:

(a) contacting the gas stream with solid adsorbent particles in an adsorption zone,
wherein the adsorption zone has at least two beds of fluidized solid adsorbent particles, and
wherein the solid adsorbent particles are flowing downwards from bed to bed, and
wherein the gas stream is flowing upwards, and
wherein the adsorption zone has at least one internal cooling means in each of the beds of fluidized solid absorbent particles, and
wherein the solid adsorbent particles comprise 15 to 75 weight % of organic amine compounds, based on the total weight of the adsorbent particles, and
wherein the gas stream entering the adsorption zone, at the pressure at which it enters the adsorption zone, has a dew point which is at least 5° C., preferably at least 10° C., below the forward flow temperature of the cooling medium in the internal cooling means having the lowest forward flow temperature in the adsorption zone;

(b) passing carbon dioxide enriched solid adsorbent particles obtained in step (a) to a riser zone (I) with a riser gas (I);

(c) heating at least a part of the carbon dioxide enriched solid adsorbent particles in the riser zone (I), optionally by means of direct or indirect heat exchange with carbon dioxide depleted solid adsorbent particles in the riser zone (II) of step (f);

(d) separating the heated carbon dioxide enriched solid adsorbent particles from the riser gas (I) at the end of the riser zone (I) in a separating device;

(e) regenerating at least a part of the carbon dioxide enriched solid absorbent particles obtained in step (d) in a desorption zone,
wherein the desorption zone has at least two beds of fluidized solid adsorbent particles, and
wherein the solid adsorbent particles are flowing downwards from bed to bed
and a stripping gas is flowing upwards, and
wherein the stripping gas comprises at least 50 volume % steam, preferably comprises at least 99 volume % steam;
wherein the desorption zone has at least one internal heating means in each of the beds of fluidized solid absorbent particles;

(f) passing carbon dioxide depleted solid adsorbent particles obtained in step (e) to a riser zone (II) with a riser gas (II);

(g) cooling at least a part of the carbon dioxide depleted solid absorbent particles in riser zone (II), optionally by means of direct or indirect heat exchange with carbon dioxide enriched solid adsorbent particles in the riser zone (I) of step (b);

(h) separating the carbon dioxide depleted solid adsorbent particles from the riser gas (II) at the end of the riser zone (II) in a separating device; and
(i) recycling at least 50%, preferably at least 80%, more preferably at least 90%, of the carbon dioxide depleted solid adsorbent particles obtained in step (h) to the adsorption zone.

DETAILED DESCRIPTION OF THE INVENTION

The present invention relates to a process for capturing carbon dioxide from a gas stream, the process comprising the steps of:
(a) contacting the gas stream with solid adsorbent particles in an adsorption zone,
wherein the adsorption zone has at least two beds of fluidized solid adsorbent particles, and
wherein the solid adsorbent particles are flowing downwards from bed to bed, and
wherein the gas stream is flowing upwards, and
wherein the adsorption zone has at least one internal cooling means in each of the beds of fluidized solid adsorbent particles, and
wherein the solid adsorbent particles comprise 15 to 75 weight % of organic amine compounds, based on the total weight of the adsorbent particles, and
wherein the gas stream entering the adsorption zone, at the pressure at which it enters the adsorption zone, has a dew point which is at least 5° C., preferably at least 10° C., below the forward flow temperature of the cooling medium in the internal cooling means having the lowest forward flow temperature in the adsorption zone;
(b) passing carbon dioxide enriched solid adsorbent particles obtained in step (a) to a riser zone (I) with a riser gas (I);
(c) heating at least a part of the carbon dioxide enriched solid adsorbent particles in the riser zone (I), optionally by means of direct or indirect heat exchange with carbon dioxide depleted solid adsorbent particles in the riser zone (II) of step (f);
(d) separating the heated carbon dioxide enriched solid adsorbent particles from the riser gas (I) at the end of the riser zone (I) in a separating device;
(e) regenerating at least a part of the carbon dioxide enriched solid absorbent particles obtained in step (d) in a desorption zone,
wherein the desorption zone has at least two beds of fluidized solid adsorbent particles, and
wherein the solid adsorbent particles are flowing downwards from bed to bed
and a stripping gas is flowing upwards, and
wherein the stripping gas comprises at least 50 volume % steam, preferably comprises at least 99 volume % steam;
wherein the desorption zone has at least one internal heating means in each of the beds of fluidized solid absorbent particles;
(f) passing carbon dioxide depleted solid adsorbent particles obtained in step (e) to a riser zone (II) with a riser gas (II);
(g) cooling at least a part of the carbon dioxide depleted solid absorbent particles in riser zone (II), optionally by means of direct or indirect heat exchange with carbon dioxide enriched solid absorbent particles in the riser zone (I) of step (b);
(h) separating the carbon dioxide depleted solid adsorbent particles from the riser gas (II) at the end of the riser zone (II) in a separating device; and
(i) recycling at least 50%, preferably at least 80%, more preferably at least 90%, of the carbon dioxide depleted solid adsorbent particles obtained in step (h) to the adsorption zone.

For the present invention, the dew point of a gas stream is defined as the temperature (at a given pressure) at which water in the gas stream will start to condense out of the gaseous phase.

For the present invention, the forward flow temperature of a cooling medium in an internal cooling means in the adsorption zone is the temperature measured using a temperature measuring device, such as a thermocouple or a resistance thermometer, arranged in the forward flow at or near the entrance of the flow into the adsorption zone. Preferably the temperature measuring device is arranged in the forward flow 1 to 10 cm before the entrance of the flow into the adsorption zone. The forward flow temperature measuring device may be configured in one embodiment as a temperature difference sensor.

The steps of the process are preferably performed in the order in which they are listed.

The process of the present invention brings about a substantial improvement in overall CO2 (=carbon dioxide) capture efficiency. The amount of CO2 that can be adsorbed on the solid particles has increased. There is efficient counter current contact between the CO2 containing gas stream and the solid adsorbent particles in the adsorption zone. And there is efficient counter current contact between the stripping gas and the solid absorbent particles to be stripped from CO2 in the desorption zone.

It proved possible to achieve a carbon capture efficiency of at least 80%, more preferably 90%, with the process of the present invention. The process can thus be used to obtain a carbon dioxide-depleted gas stream comprising less than 20% of the CO2 which was present in the carbon dioxide containing gas stream before treatment. It is even possible to achieve a stream comprising less than 10%, or even less than 5% of the CO2 which was present in the carbon dioxide containing gas stream before treatment.

A further advantage of the process of the present invention is the high selectivity towards CO2, and the affinity to CO2, in the absorber. With the process it is possible to capture mainly CO2, or even only CO2. And the process is suitable to treat gases with a low amount of CO2. For example flue gases, which are often highly diluted CO2 streams, can be very effectively treated with a process according to the present invention.

Another advantage of the present invention is that during the process the formation of lumps of adsorbent particles on cooling coils with condensed water is minimized, or even prevented.

A further advantage of the present invention is that the process has a good heat integration.

Heat Integration

In the process of the invention, heat is required for the heating of carbon dioxide enriched solid adsorbent particles before their entry in the desorption zone, for the heating means in the desorption zone, and for the generation of steam.

Cooling is required for the cooling of carbon dioxide depleted solid absorbent particles before re-entry into the adsorption zone, for the cooling means in the adsorption zone, and optionally for cooling the carbon dioxide comprising gas stream that is treated in the process.

It has now been found that the combination of the specific dew point range for the gas stream entering the adsorption zone in step (a) and the steam regeneration of step (e) results in an advanced heat integration. An internal heat displacement between the adsorption zone and the desorption zone has been observed; see also FIG. 3 which is elaborated on below in the section for Examples A and FIG. 3.

Without wishing to be bound to any theory, it may be the case that water is adsorbed onto the solid absorbent particles in the desorption zone. This may lead to release of heat. This is advantageous as the desorption zone requires heating for the desorption of $CO_2$ from the solid absorbent particles. Further, it may be the case that water is desorbed again from the solid absorbent particles in the adsorption zone. This may lead to cooling. This is advantageous as the adsorption zone requires cooling for the adsorption of $CO_2$ to the solid absorbent particles. It was found that with a humidity increase of the gas stream used in step (a), and thus an increase of the dew point of this gas stream, this internal heat displacement effect was reduced.

Another option for heat integration is the following. Carbon dioxide enriched solid adsorbent particles in riser zone (I) preferably are heated in step (c) by means of direct or indirect heat exchange with carbon dioxide depleted solid adsorbent particles in riser zone (II). Simultaneously, carbon dioxide depleted solid adsorbent particles in riser zone (II) preferably are cooled in step (g) by means of direct or indirect heat exchange with carbon dioxide enriched solid adsorbent particles in riser zone (I).

In other words, heat exchange between relatively cold carbon dioxide enriched adsorbent particles in riser zone (I) and relatively warm carbon dioxide depleted adsorbent particles in riser zone (II) may be performed by direct or indirect heat exchange.

In case of direct heat exchange, counter current direct heat exchange may be applied.

Additionally or alternatively, indirect heat exchangers may be present in the riser zones. For example tubular heat exchangers or plate heat exchangers may be used as indirect heat exchangers. The indirect heat exchangers are preferably present at the bottom of the riser zones. A heat carrier medium may be circulated between an indirect heat exchanger in riser zone (I) and an indirect heat exchanger in riser zone (II).

In a preferred embodiment, the solid particles enter each riser zone at a higher level than the riser gas. Indirect heat exchangers may be present in each riser below the solids entry and above the riser gas entry. The area of a riser zone below the solids entry may have a larger cross-section than the rest of the riser zone.

Heat exchange between relatively cold carbon dioxide enriched adsorbent particles in riser zone (I) and relatively warm carbon dioxide depleted adsorbent particles in riser zone (II) is thus a preferred additional option for heat integration in the present process.

A further option for heat integration is the following. A mixture of captured carbon dioxide and stripping steam leaves the desorption zone. This mixture can be subjected to compression, for example multi-stage compression. This results in an increase of the temperature of the mixture of $CO_2$ and steam to above the operating temperature of the desorption zone. The excess heat can be used to produce steam for the desorption zone. After cooling of the mixture, condensed water can be separated and recycled.

And another option for heat integration is the following. A heat pump system can be used to arrange heat exchange between the cooling means, for example cooling coils, of the absorption zone and the heating means, for example heating coils, of the desorption zone. The aim of this is to use the heat that is released by the $CO_2$ adsorption in the adsorption zone for the heating that is required for the $CO_2$ desorption in the desorption zone.

Step (a)

The gas to be treated may, for example, be natural gas, associated gas, synthesis gas, gas originating from coal gasification, coke oven gas, refinery gas, hydrogen containing gas, or flue gas. Synthesis gas may be obtained, for instance, by (catalytic) partial oxidation and/or by steam methane reforming of hydrocarbons.

The gas to be treated may comprise in the range of from 0.1 to 70 vol %, preferably from 1 to 45 vol %, carbon dioxide, calculated on the total volume of the gas. In the event that the gas is a flue gas, the amount of carbon dioxide will generally be low. A flue gas may comprise in the range of from 0.1 to 20 vol % $CO_2$, preferably 5 to 15 vol %, more preferably 1 to 10 vol % $CO_2$.

Flue gas may comprise oxygen. Flue gas typically comprises in the range of from 0.25 to 20 vol %, or from 0.5 to 15 vol %, or 1 to 10 vol % oxygen ($O_2$).

In case the temperature of the gas stream to be treated is relatively high, the gas stream may cooled prior to being subjected to step (a). Cooling of the gas may be done by means known in the art, for example using a fan, a cooler or a gas-gas exchanger.

In step (a) of the process a gas stream comprising carbon dioxide is contacted with solid adsorbent particles in an adsorption zone. In step (a) a $CO_2$ depleted gas stream and $CO_2$ enriched solid adsorbent particles are obtained. The $CO_2$ depleted gas stream leaves the adsorption zone at the top of the adsorption zone. A part of the $CO_2$ depleted gas stream may be used, together with steam, as riser gas in the riser zone (II) in step (f). The $CO_2$ enriched solid adsorbent particles leave the adsorption zone at the bottom of the adsorption zone.

The adsorption zone has at least two beds of fluidized solid adsorbent particles. The beds are arranged above each other. The solid adsorbent particles are flowing downwards from bed to bed, and the gas stream is flowing upwards. This results in a more efficient $CO_2$ adsorption as compared to co-current flowing processes. This also results in a more efficient $CO_2$ adsorption as compared to processes where the solid particles are mixed throughout a single stage fluidized bed.

The adsorption zone preferably comprises in the range of from 3 up to 30, more preferably from 4 up to 15, beds of fluidized solid adsorbent particles.

Preferably, the beds of fluidized solid adsorbent particles in the adsorption zone are present above sieve plates and/or nozzle plates. Preferably these sieve plates and/or nozzle plates comprise overflow weirs. Preferably these sieve plates and/or nozzle plates comprise downcomers. Most preferably the sieve plates and/or nozzle plates comprise downcomers and overflow weirs.

Once the solid adsorbent particles reach the bottom of the adsorption zone, they are carbon dioxide enriched.

The adsorption zone has at least one internal cooling means in each of the beds of fluidized solid absorbent particles. An example of a suitable cooling means is a cooling coil.

The gas stream entering the adsorption zone, at the pressure at which it enters the adsorption zone, has a dew point which is at least 5° C., preferably at least 10° C., below the forward flow temperature of the cooling medium in the internal cooling means having the lowest forward flow temperature in the adsorption zone.

The temperature of the gas stream at which water in the gas stream will start to condense out of the gaseous phase is the dew point of the gas stream. The dew point is pressure dependent. The pressure of the gas stream in the adsorption zone is higher at the entry of the adsorption zone than at the top of the adsorption zone.

When the gas stream leaves at the top of the adsorption zone as a CO2 depleted gas stream, its pressure may be equal to or close to atmospheric pressure. When the gas stream enters the adsorption zone the pressure may be above atmospheric pressure, e.g. 1.05 bara. The total pressure drop over the adsorption zone, e.g. an adsorption column, can be relatively small, it may for example be 50 mbar.

The dew point of the gas stream (at the pressure at which it enters the adsorption zone) has to be at least 5° C. lower than the lowest forward flow temperature of cooling medium in the adsorption zone. In other words, it has to be at least 5° C. lower than the forward flow temperature of the cooling medium in the internal cooling means having the lowest forward flow temperature in the adsorption zone. Water in the gas stream will thus not or hardly condense on the cooling means, for example cooling coils, in the adsorption zone.

As mentioned above, the forward flow temperature of a cooling medium in an internal cooling means in the adsorption zone is the temperature measured using a temperature measuring device, such as a thermocouple or a resistance thermometer, arranged in the forward flow at or near the entrance of the flow into the adsorption zone. Preferably the temperature measuring device is arranged in the forward flow 1 to 10 cm before the entrance of the flow into the adsorption zone. The forward flow temperature measuring device may be configured in one embodiment as a temperature difference sensor.

Preferably the forward flow temperature of the cooling medium in the internal cooling means having the lowest forward flow temperature in the adsorption zone is at least 5° C., preferably at least 10° C., below the average temperature in the bed of fluidized solid adsorbent particles which comprises this internal cooling means. For a bed of fluidized solid adsorbent particles isothermal conditions can often be assumed. In that case determining the temperature at one or two places in the fluidized bed may suffice to determine the average temperature in the bed of fluidized solid adsorbent particles.

The dew point of the gas stream entering the adsorption zone in step (a) can be adjusted by adjusting the humidity of the gas stream. It may be necessary to dry flue gas before it is used as CO2 comprising gas stream in step (a). One option is to cool the flue gas to the desired dew point temperature, and to separate the gas from any condensed water.

The solid adsorbent particles comprise 15 to 75 weight % of organic amine compounds, based on the total weight of the adsorbent particles. Preferably, the solid adsorbent particles comprise 30 to 65 weight %, more preferably 40 to 60 weight %, of organic amine compounds, based on the total weight of the adsorbent particles.

Preferably, the solid adsorbent particles comprise a carrier material and one or more types of organic amine compounds.

Preferably the organic amine compounds cover at least 50%, more preferably at least 80%, even more preferably at least 90% of the total surface area of the adsorbent particles. The total surface area is the outer surface of the particles plus the surface area of the pores.

Most preferably the solid adsorbent particles comprise a carrier material that has been impregnated or grafted with one or more types of organic amine compounds.

Preferably the solid adsorbent particles comprise one or more primary, secondary and/or tertiary organic amine compounds chosen from the group of monoethanol amine (MEA), diethanolamine (DEA), triethanolamine (TEA), diisopropanolamine (DIPA), monomethyl-ethanolamine (MMEA) and methyldiethanolamine (MDEA) and diethyl-monoethanolamine (DEMEA).

More preferably the solid adsorbent particles comprise one or more secondary or tertiary organic amine compounds chosen from the group of diethanolamine (DEA), diisopropanolamine (DIPA), monomethyl-ethanolamine (MMEA), methyldiethanolamine (MDEA) and diethyl-monoethanolamine (DEMEA), most preferably DIPA and/or MDEA.

Even more preferably the solid adsorbent particles comprise one or more polyethylene amines chosen from the group of diethylenetriamine (DETA), triethylenetetramine (TETA), tetraethylenepentamine (TEPA), tetraacetylethylenediamine (TAED), polyethylenehexamine such as pentaethylenehexamine (PEHA) and polyethyleneimine (PEI), still more preferably TEPA or PEI, most preferably PEI. When the solid adsorbent particles comprise PEI, they may additionally comprise (3-aminopropyl)triethoxysilane (APTES).

When the solid adsorbent particles comprise a carrier material, the carrier material preferably is selected from the group consisting of porous metal oxides, activated carbons, zeolites, metal-organic frameworks, zeolitic-imidazolate frameworks, and polymers.

More preferably the carrier material is selected from the group consisting of mesoporous metal oxides and polymers. Even more preferably the carrier material is selected from the group consisting of mesoporous metal oxides and polymethyl methacrylate (PMA).

When the carrier material is a mesoporous metal oxide, the carrier material preferably is selected from the group consisting of silica, alumina, titania, zirconia, magnesium oxide, amorphous silica-aluminas (ASA), and combinations thereof, more preferably silica.

Preferably the solid adsorbent particles have an average pore volume in the range of from 0.9 to 1.8 g/ml, a bulk density in the range of from 0.3 to 0.7 g/ml, preferably 0.4 to 0.6 g/ml, an average particle diameter (d50) in the range of from 100 to 800 micrometer, and an average total surface area in the range of from 250 to 1000 m2/g, preferably in the range of from 250 to 750 m2/g, more preferably in the range of from 250 to 500 m2/g.

Preferably, step (a) is carried out at a temperature in the range of from 67 to 140° C., more preferably 70 to 120° C., even more preferably 70 to 80° C.

Preferably, step (a) is carried out at a pressure in the range of from 0.8 to 8 bara, more preferably 0.8 to 4 bara, even more preferably 0.8 to 1.5 bara.

In the adsorption zone a gas stream and solid adsorbent particles are present. The volume of the gas stream may be higher than the volume of solid adsorbent particles. In the adsorption zone the ratio of the volume of the gas stream over the volume of the solid particles may be in the range of from 2 to 200. In the adsorption zone the ratio of the volumetric flow rate of the gas stream over the volumetric flow rate of the solid particles may be in the range of from 2 to 200.

In step (a) a CO2 depleted gas stream and CO2 enriched solid adsorbent particles are obtained. Preferably more than 70%, more preferably more than 80%, even more preferably more than 90%, still more preferably more than 95% of CO2 is removed, calculated on the total amount of CO2 in the gas stream that is contacted with solid adsorbent particles in step (a).

Step (b)

In step (b) carbon dioxide enriched solid adsorbent particles obtained in step (a) are passed to a riser zone (I) with a riser gas (I). The riser gas (I) is used to transport the solid particles upwards. Preferably a gas comprising at least 80 vol % CO2, preferably at least 99 vol % $CO_2$, is used as riser gas in the riser zone (I) in step (b). All or at least a part of the carbon dioxide enriched solid adsorbent particles obtained in step (a) is passed to riser zone (I).

Step (c)

In step (c) at least a part of the carbon dioxide enriched solid adsorbent particles in the riser zone (I) is heated. Preferably all, or at least 99%, of the carbon dioxide enriched solid adsorbent particles obtained in the adsorption zone and introduced into the desorption zone via the riser zone (I) is heated in the riser zone (I) in step (c).

Preferably, at least a part of the carbon dioxide enriched solid adsorbent particles is heated by means of direct or indirect heat exchange with carbon dioxide depleted solid adsorbent particles in the riser zone (II) of step (f). As explained in the section "heat integration", counter current direct heat exchange may be applied between riser zones (I) and (II), and additionally or alternatively, indirect heat exchangers may be present in the riser zones (I) and (II).

Step (d)

In step (d) the heated carbon dioxide enriched solid adsorbent particles are separated from the riser gas (I) at the end of the riser zone (I) in a separating device.

Separation of the solid particles from the gas may be carried out, for example, by means of one or more cyclones and/or filters and/or inertial separators and/or baffle separators and/or gravity separators.

Step (e)

In step (e) at least a part, preferably at least 90%, more preferably all, of the carbon dioxide enriched solid adsorbent particles obtained in step (d) is regenerated in a desorption zone. In step (e) a gas stream with an increased CO2 content and CO2 depleted solid adsorbent particles are obtained. The CO2 enriched stripping gas stream leaves the desorption zone at the top of the desorption zone. The CO2 depleted solid adsorbent particles leave the desorption zone at the bottom of the desorption zone.

The desorption zone has at least two beds of fluidized solid adsorbent particles. The beds are arranged above each other. The solid adsorbent particles are flowing downwards from bed to bed and a stripping gas is flowing upwards. This results in a more efficient CO2 desorption as compared to co-current flowing processes. This also results in a more efficient CO2 desorption as compared to processes where the solid particles are mixed throughout a single stage fluidized bed.

The desorption zone preferably comprises in the range of from 3 up to 10, more preferably from 4 up to 8 beds of fluidized solid adsorbent particles.

Preferably, the beds of fluidized solid adsorbent particles in the adsorption zone are present above sieve plates and/or nozzle plates. Preferably these sieve plates and/or nozzle plates comprise overflow weirs. Preferably these sieve plates and/or nozzle plates comprise downcomers. Most preferably the sieve plates and/or nozzle plates comprise downcomers and overflow weirs.

Once the solid adsorbent particles reach the bottom of the desorption zone, they are carbon dioxide depleted.

The stripping gas comprises at least 50 volume % steam, preferably at least 90 volume % steam, more preferably comprises at least 99 volume % steam.

The desorption zone has at least one internal heating means in each of the beds of fluidized solid absorbent particles. An example of a suitable heating means is a heating coil.

Preferably step (e) is carried out at a temperature in the range of from 100 to 140° C., preferably 110 to 130° C.

Preferably step (e) is carried out at a pressure in the range of from 0.8 to 8 bara, more preferably 0.8 to 4 bara, even more preferably 0.8 to 1.5 bara.

In the desorption zone a steam comprising stripping gas and carbon dioxide enriched solid adsorbent particles are present. The volume of the stripping gas may be higher than the volume of solid adsorbent particles. In the desorption zone the ratio of the volume of the stripping gas over the volume of the solid particles may be in the range of from 2 to 200.

The carbon dioxide depleted adsorbent particles obtained in step (e) may be re-used in step (a) of the process.

Step (f)

In step (f) carbon dioxide depleted solid adsorbent particles obtained in step (e) are passed to a riser zone (II) with a riser gas (II). The riser gas (II) is used to transport the solid particles upwards. Preferably a gas comprising at most 5 vol % CO2 is used as riser gas in the riser zone (II). The riser gas in the riser zone (II) in step (f) preferably comprises less than 3 vol % $O_2$ and less than 3 vol % $N_2$. Preferably the gas comprising at most 5 vol % CO2 used as riser gas (II) in the riser zone (II) is or comprises carbon dioxide depleted gas obtained in step a). It is possible to use a mixture of steam and carbon dioxide depleted gas obtained in step a) as riser gas (II) in step (f).

More preferably a mixture of steam and carbon dioxide depleted gas obtained in step a) is used as riser gas in the riser zone (II). In that case it would not be necessary to recycle all the carbon dioxide depleted gas obtained in step a). A part of the carbon dioxide depleted gas obtained in step a) would suffice for the mixture of steam and CO2 depleted gas that may be used as riser gas (II).

All or at least a part of the carbon dioxide depleted solid adsorbent particles obtained in step (e) is passed to riser zone (II). Preferably at least 80%, more preferably at least 90% of the carbon dioxide depleted solid adsorbent particles obtained in step (e) are recycled to the adsorption zone.

Step (g)

In step (g) at least a part of the carbon dioxide depleted solid absorbent particles in riser zone (II) are cooled. Preferably all, or at least 99%, of the carbon the desorption zone and recycled to the adsorption zone is cooled in step (g).

Preferably, at least a part of the carbon dioxide depleted solid adsorbent particles is cooled by means of direct or indirect heat exchange with carbon dioxide enriched solid adsorbent particles in the riser zone (I) of step (b). As explained in the section "heat integration", counter current direct heat exchange may be applied between riser zones (I) and (II), and additionally or alternatively, indirect heat exchangers may be present in the riser zones (I) and (II).

Step (h)

In step (h) the carbon dioxide depleted solid adsorbent particles are separated from the riser gas (II) at the end of the riser zone (II) in a separating device.

Separation of the solid particles from the gas may be carried out, for example, by means of one or more cyclones and/or filters and/or inertial separators and/or baffle separators and/or gravity separators.

Step (i)

In step (i) at least 50%, preferably at least 80%, more preferably at least 90%, of the carbon dioxide depleted solid adsorbent particles obtained in step (h) are recycled to the adsorption zone.

Preferably at least 80%, more preferably at least 90%, even more preferably all, of the carbon dioxide depleted solid adsorbent particles obtained in step (h) are recycled to the adsorption zone.

In a preferred embodiment fresh solid adsorbent particles are added to the adsorption zone. Fresh particles may be added as make up stream in case less than 100% of the carbon dioxide depleted solid adsorbent particles obtained in step (e) is recycled to the adsorption zone, and/or in case less than 100% of the carbon dioxide enriched solid adsorbent particles obtained in step (a) is subjected to regeneration. Solid adsorbent particles can be removed from the process in batches or continuously, while adding fresh solid adsorbent particles to the adsorption zone.

Preferably, the height to diameter ratio of the adsorption zone used in a process according to the present invention is in the range of from 0.25-30. Preferably, the height to diameter ratio of the desorption zone used in a process according to the present invention is in the range of from 0.25-30.

FIGS. 1 and 3

The present invention will be further illustrated with reference to the drawings, wherein.

Figure 1:
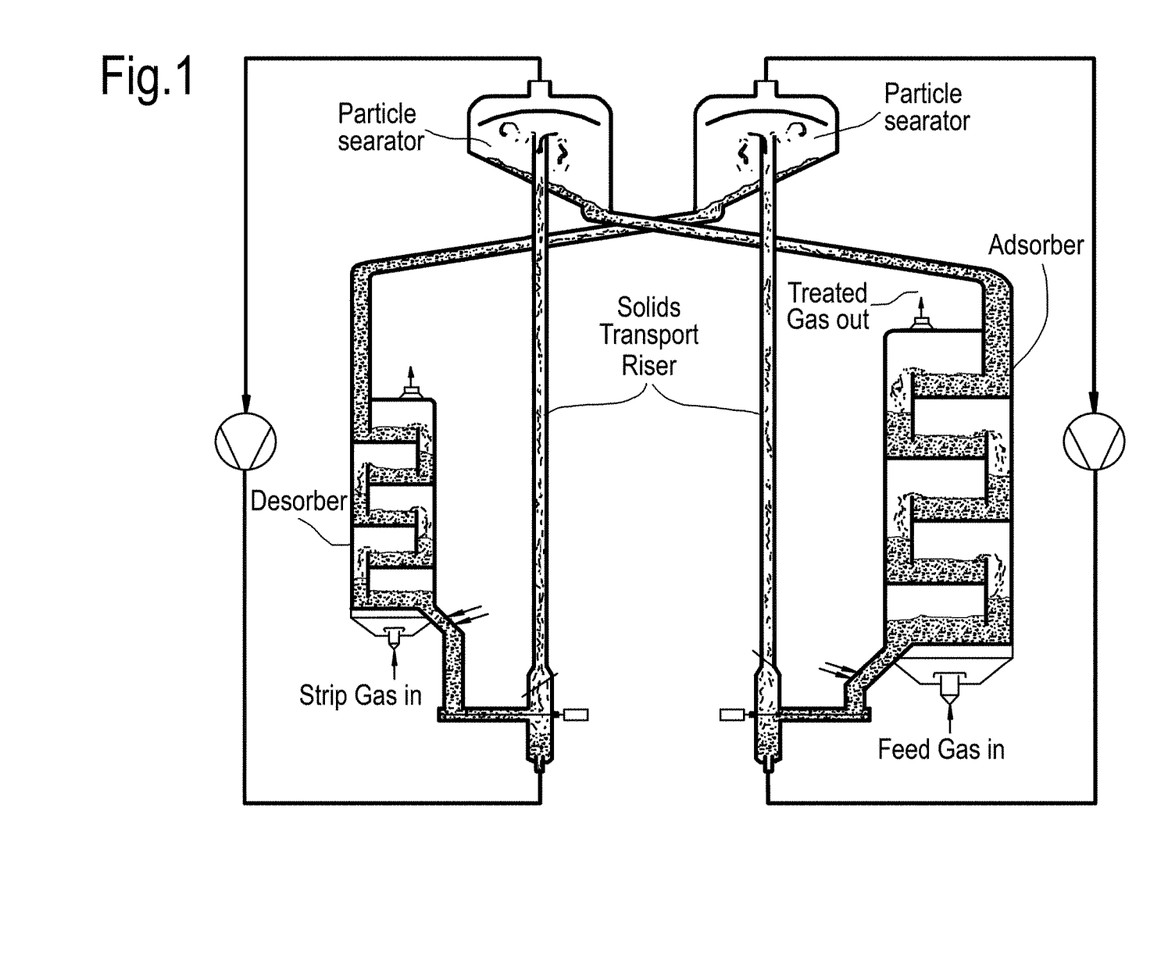
FIG. 1 shows a schematic diagram of an embodiment of a device that can be used for a process according to the invention.

FIG. 1 shows a schematic diagram of an embodiment of a device that can be used for a process according to the invention. The device shown contains an adsorber, a desorber, two risers and two particle separators. A feed gas enters at the bottom of the adsorber, and a strip gas enters at the bottom of the desorber. Solid adsorber particles flow over overflow weirs and move down from fluidized bed to fluidized bed in the adsorber as well as in the desorber.

Figure 2:
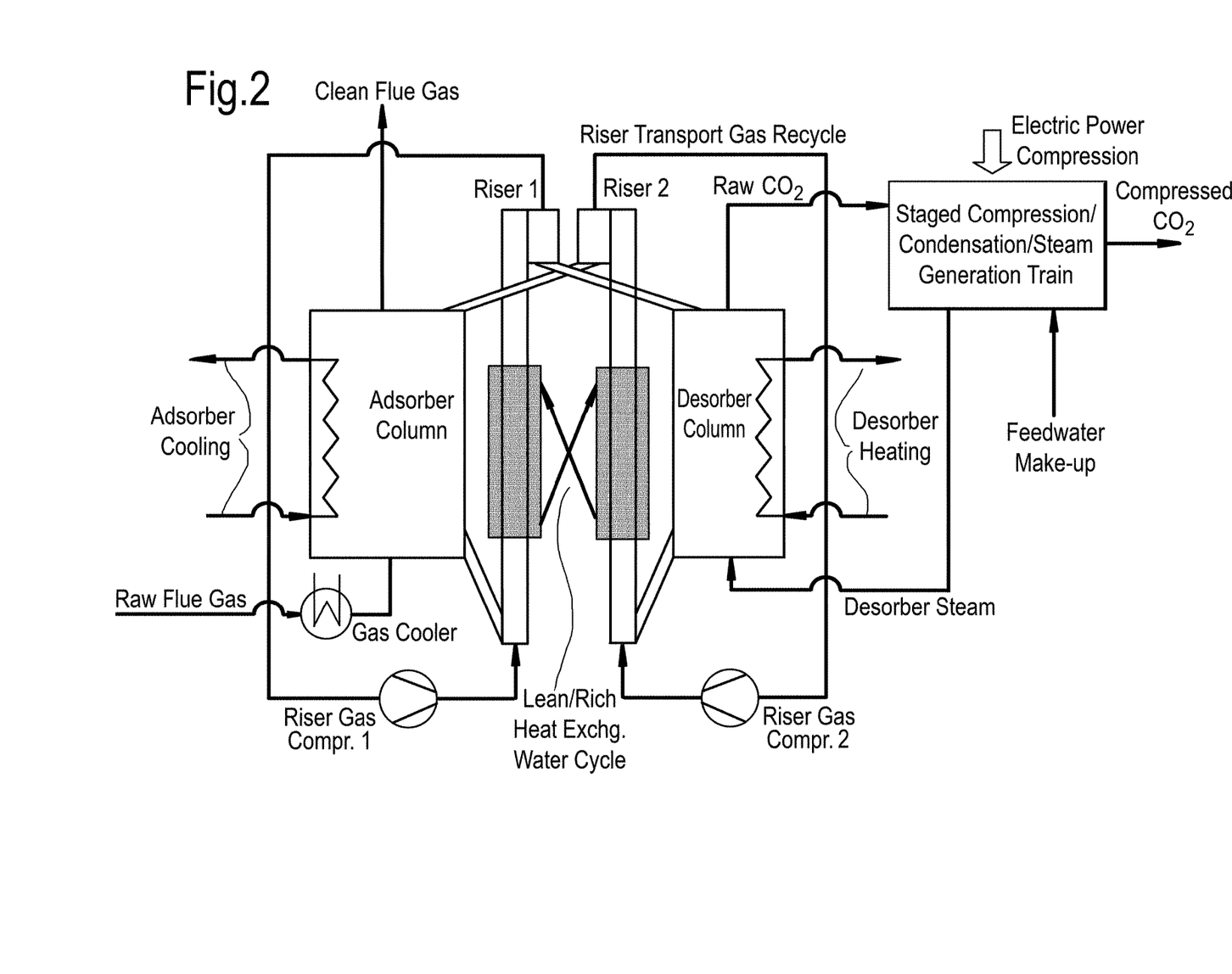
FIG. 2 shows a line-up that can be used for a process according to the invention including heat integration.

FIG. 2 shows a line-up that can be used for a process according to the invention including heat integration. When applying the process of the invention, use may be made of heat integration. This can be done through heat exchange between hot stream(s) and cold stream(s) directly or indirectly, or with additional equipment, e.g. through the application of heat pumps. FIG. 2 shows the application of a lean rich heat exchanger between the two risers. An additional working fluid may be used for this heat exchange.

Figure 3:
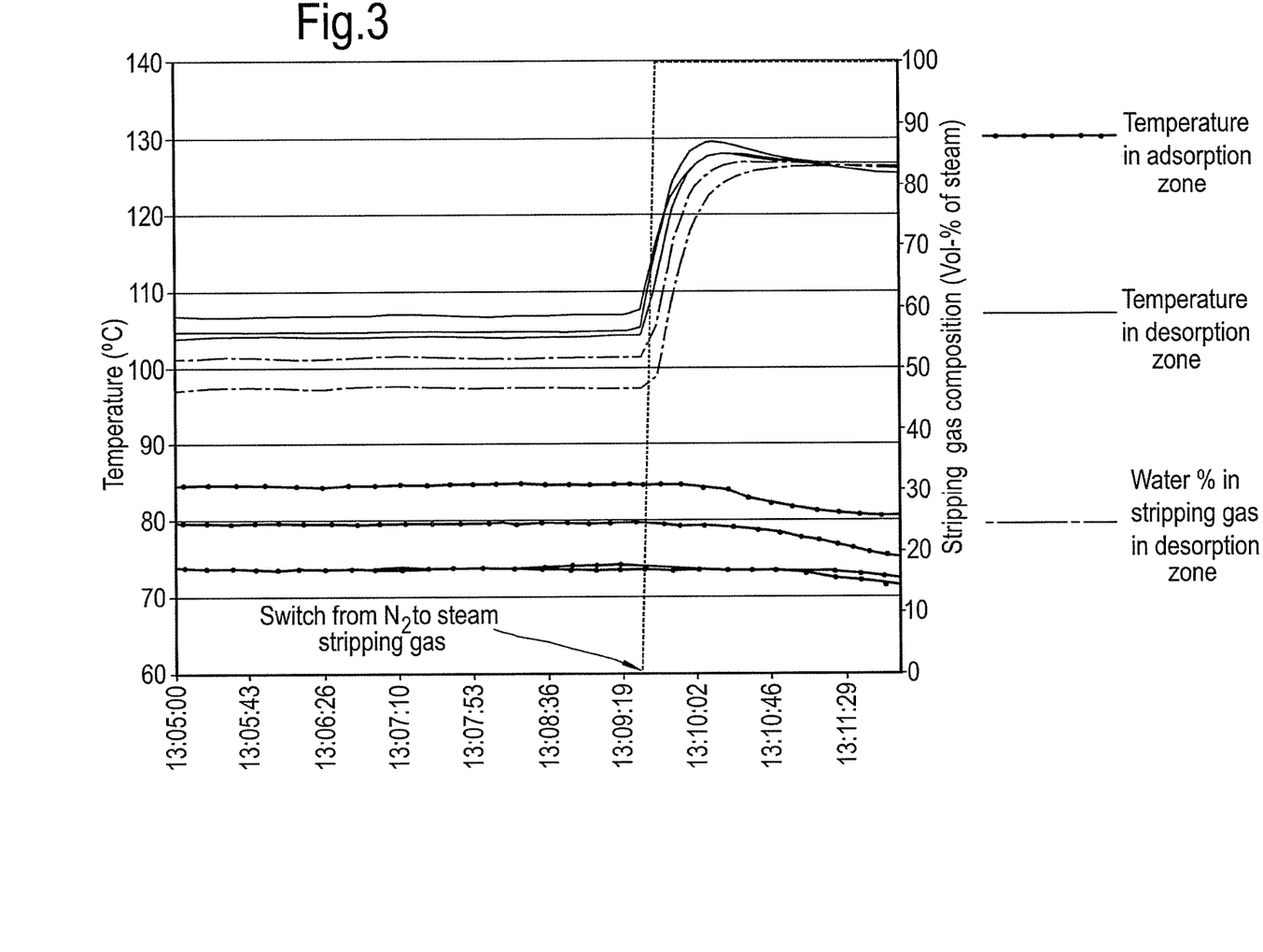
FIG. 3 shows the temperature profile of the desorption zone and the adsorption zone under two types of stripping gas.

Examples A and FIG. 3

The apparatus used in the examples A for a process according to the invention is characterized as follows. The adsorption zone has an internal diameter of 150 mm and comprises 5 staged fluidized beds; the desorption zone has an internal diameter of 110 mm and comprises of 5 staged fluidized beds.

In all cases the weir height of the fluidized beds was 60 mm. The two risers have an internal diameter of 25 mm.

The silica carrier comprises spherical particles with an average particle diameter (d50) of about 300 micrometer and a pore volume of 1.1 ml/g and is impregnated with PEI to arrive at a 50% PEI loading.

In one experiment, a dry gas stream entered the adsorption zone. FIG. 3 shows the temperature profile of the desorption zone and the adsorption zone under two types of stripping gas. The temperature of both types of stripping gas when entering the desorption zone was the same.

When the stripping gas was nitrogen, the temperature of the desorption zone was higher than the temperature of the adsorption zone. When the stripping gas was switched from nitrogen to steam, the temperature in the adsorption zone slightly decreased, and the temperature in de desorption zone was significantly increased. This is exemplified by the data for Examples A with a dry gas stream in FIG. 3.

In another experiment, the gas stream entering the adsorption zone in step (a) contained some moisture; it had a dew point of more than 5° C. below the forward flow temperature of the cooling medium in the internal cooling means having the lowest forward flow temperature in the adsorption zone. When the stripping gas was switched from nitrogen to steam, the temperature in the adsorption zone slightly decreased, and the temperature in de desorption zone was significantly increased.

As discussed above, in the section about heat integration, it was found that the combination of the specific dew point range for the gas stream entering the adsorption zone in step (a), and the steam regeneration of step (e) resulted in an advanced heat integration. An internal heat displacement between the adsorption zone and the desorption zone was observed.

In yet another experiment, the gas stream entering the adsorption zone in step (a) contained too much moisture. Lumps of catalyst particles formed on the cooling coils in the adsorption zone due to condensation of water on the cooling coils.

Hence, drying of flue gas is often desired in order to avoid catalyst lump formation in the adsorption zone. It was now found that is not necessary to dry flue gas completely; this saves energy. Furthermore, a gas with the specific dew point range shows an advanced heat integration.

Further, it was found that the overall performance was higher when steam was used as stripping gas as compared to the use of nitrogen as stripping gas.

Examples B and Table

The apparatus used in the examples B for a process according to the invention is characterized as follows. The adsorption zone has an internal diameter of 150 mm and comprises 5 staged fluidized beds; the desorption zone has an internal diameter of 110 mm and comprises of 5 staged fluidized beds.

In all cases the weir height of the fluidized beds was 60 mm. The two risers have an internal diameter of 25 mm.

The silica carrier comprises spherical particles with an average particle diameter (d50) of about 300 micrometer and a pore volume of 1.1 ml/g and is impregnated with PEI to arrive at a 50% PEI loading.

A dried gas stream entered the adsorption zone. In the desorption zone nitrogen was used as stripping gas.

Examples B show that high capture efficiencies can be achieved with the process of the present invention; see the Table below.

TABLE

| Exp nr | Total gas feed (Nm3/h) | CO2 conc. (v %) | Solid recycle rate (kg/h) | Temp top bed in adsorber (deg C.) | Temp bottom bed in desorber (deg C.) | CO2 Capture efficiency (%) | CO2 captured (kg/d) |
|---|---|---|---|---|---|---|---|
| 3.1 | 15.8 | 5 | 18 | 79 | 116 | 78 | 30 |
| 3.3 | 15.8 | 5 | 25 | 75 | 110 | 90 | 34 |
| 2.1 | 15.8 | 5 | 33 | 77 | 107 | 96 | 37 |
| 2.3 | 32 | 5 | 33 | 82 | 107 | 56 | 43 |
| 4.2 | 15.8 | 10 | 25 | 89 | 109 | 58 | 44 |

The results of Example B show that increasing the solid recycle rate improves the CO2 capture efficiency (example 3.1, 3.3 and 2.1). Increasing the total gas feed results in a decreased capture efficiency (example 2.1 and 2.3). Increasing the concentration of CO2 in the feed gas also decreases the capture efficiency (example 3.3 and 4.2).

That which is claimed is:

1. A process for capturing carbon dioxide from a gas stream, the process comprising the steps of:
    (a) contacting the gas stream with solid adsorbent particles in an adsorption zone, wherein the adsorption zone has at least two beds of fluidized solid adsorbent particles, and
    wherein the solid adsorbent particles are flowing downwards from bed to bed, and
    wherein the gas stream is flowing upwards, and
    wherein the adsorption zone has at least one internal cooling means in each of the beds of fluidized solid absorbent particles, and
    wherein the solid adsorbent particles comprise 15 to 75 weight % of organic amine compounds, based on the total weight of the adsorbent particles, and
    wherein the gas stream entering the adsorption zone, at the pressure at which it enters the adsorption zone, has a dew point which is at least 5° C., below the forward flow temperature of the cooling medium in the internal cooling means having the lowest forward flow temperature in the adsorption zone;
    (b) passing carbon dioxide enriched solid adsorbent particles obtained in step (a) to a riser zone (I) with a riser gas (I);
    (c) heating at least a part of the carbon dioxide enriched solid adsorbent particles in the riser zone (I), optionally by means of direct or indirect heat exchange with carbon dioxide depleted solid adsorbent particles in the riser zone (II) of step (f);
    (d) separating the heated carbon dioxide enriched solid adsorbent particles from the riser gas (I) at the end of the riser zone (I) in a separating device;
    (e) regenerating at least a part of the carbon dioxide enriched solid absorbent particles obtained in step (d) in a desorption zone,
    wherein the desorption zone has at least two beds of fluidized solid adsorbent particles, and
    wherein the solid adsorbent particles are flowing downwards from bed to bed and a stripping gas is flowing upwards, and
    wherein the stripping gas comprises at least 50 volume % steam;
    wherein the desorption zone has at least one internal heating means in each of the beds of fluidized solid absorbent particles;
    (f) passing carbon dioxide depleted solid adsorbent particles obtained in step (e) to a riser zone (II) with a riser gas (II);
    (g) cooling at least a part of the carbon dioxide depleted solid absorbent particles in riser zone (II), optionally by means of direct or indirect heat exchange with carbon dioxide enriched solid adsorbent particles in the riser zone (I) of step (b);
    (h) separating the carbon dioxide depleted solid adsorbent particles from the riser gas (II) at the end of the riser zone (II) in a separating device; and
    (i) recycling at least 50% of the carbon dioxide depleted solid adsorbent particles obtained in step (h) to the adsorption zone.

2. The process according to claim 1, wherein the beds of fluidized solid adsorbent particles in the adsorption zone and/or in the desorption zone are present above sieve plates and/or nozzle plates, and wherein the sieve plates and/or nozzle plates comprise overflow weirs and downcomers.

3. The process according to claim 1, wherein in step (b) a gas comprising at least 80 vol % CO2, is used as riser gas in the riser zone (I), and/or
    wherein in step (f) a gas comprising at most 5 vol % CO2 is used as riser gas in the riser zone (II);
    wherein the gas comprising at most 5 vol % CO2 comprises carbon dioxide depleted gas obtained in step a), or a mixture of steam and carbon dioxide depleted gas obtained in step a).

4. The process according to claim 1, wherein at least 80% of the carbon dioxide depleted solid adsorbent particles obtained in step (h) are recycled to the adsorption zone in step (i).

5. The process according to claim 1, wherein fresh solid adsorbent particles are added to the adsorption zone.

6. The process according to claim 1, wherein the gas stream used in step a) comprises in the range of from 0.1 to 70 vol % carbon dioxide.

7. The process according to claim 1, wherein the solid adsorbent particles comprising 15 to 75 weight % of organic amine compounds comprise a carrier material and one or more types of organic amine compounds.

8. The process according to claim 7, wherein the solid adsorbent particles comprise one or more primary, secondary and/or tertiary organic amine compounds chosen from the group of monoethanol amine (MEA), diethanolamine (DEA), triethanolamine (TEA), diisopropanolamine (DIPA), monomethyl-ethanolamine (MMEA) and methyldiethanolamine (MDEA) and diethyl-monoethanolamine (DEMEA).

9. The process according to claim 7, wherein the solid adsorbent particles comprise one or more polyethylene amines chosen from the group of diethylenetriamine (DETA), triethylenetetramine (TETA), tetraethylenepentamine (TEPA), tetraacetylethylenediamine (TAED), polyethylenehexamine such as pentaethylenehexamine (PEHA) and polyethyleneimine (PEI).

10. The process according to claim 9, wherein the solid adsorbent particles comprise PEI, or PEI and (3-aminopropyl)triethoxysilane (APTES).

11. The process according to claim 6, wherein the carrier material is selected from the group consisting of porous metal oxides, activated carbons, zeolites, metal-organic frameworks, zeolitic-imidazolate frameworks, and polymers, and polymethyl methacrylate (PMA).

12. The process according to claim 11, wherein the carrier material is selected from the group consisting of silica, alumina, titania, zirconia, magnesium oxide, amorphous silica-aluminas (ASA), and combinations thereof.

13. The process according to claim 1, wherein the solid adsorbent particles have an average pore volume in the range of from 0.9 to 1.8 g/ml, a bulk density in the range of from 0.3 to 0.7 g/ml, an average particle diameter in the range of from 100 to 800 micrometer, and an average total surface area in the range of from 250 to 1000 m2/g.

14. The process according to claim 1, wherein step (a) is carried out at a temperature in the range of from 67 to 140° C.

15. The process according to claim 2,
wherein the forward flow temperature of the cooling medium in the internal cooling means having the lowest forward flow temperature in the adsorption zone is at least 5° C., below the average temperature in the bed of fluidized solid adsorbent particles which comprises this internal cooling means.

* * * * *